United States Patent [19]

Anzalone

[11] 4,164,852
[45] Aug. 21, 1979

[54] FAN MOTOR UNIT FOR ROOM AIR CONDITIONER

[75] Inventor: Carmen J. Anzalone, Old Bridge, N.J.

[73] Assignee: Fedders Corporation, Edison, N.J.

[21] Appl. No.: 872,365

[22] Filed: Jan. 26, 1978

[51] Int. Cl.² ........................................... F25D 17/06
[52] U.S. Cl. ...................................... 62/429; 62/262; 310/112; 417/350
[58] Field of Search ................. 62/262, 263, 429, 427; 417/350, 423; 310/112, 114

[56] References Cited
U.S. PATENT DOCUMENTS

| | | | |
|---|---|---|---|
| 2,736,176 | 2/1956 | Carlton | 62/262 |
| 2,986,016 | 5/1961 | Gillham et al. | 62/429 |
| 3,083,893 | 4/1963 | Dean | 310/112 |

Primary Examiner—Ronald C. Capossela
Attorney, Agent, or Firm—McAulay, Fields, Fisher & Goldstein

[57] ABSTRACT

A fan motor unit for use in combination with a room air conditioner has two separate motors formed in a unitary housing for separately driving the evaporator and the condenser coil fans. By tailoring the characteristics of each motor to the requirements of each motor's respective fans, a reduction in total energy consumed by the unit can be realized.

13 Claims, 4 Drawing Figures

FOUR POLE OR SIX POLE MOTOR CONTROL

SIX POLE OR FOUR POLE MOTOR CONTROL

FAN MOTOR UNIT FOR ROOM AIR CONDITIONER

BACKGROUND OF THE INVENTION

Conventional room air conditioner systems normally employ a large double shafted motor to drive the inside (evaporator) coil fan or blower and simultaneously to drive the outside (condenser) coil fan or blower; or, less usually, two individual motors, each separately mounted: one motor driving the indoor coil fan and the other motor driving the outdoor coil fan.

There are many advantages to utilizing a unitary housing double-motor unit. As discussed below, it will be evident that some of the advantages are inherent in the flexibility of utilizing two separate motors while other of the advantages occur as a result of utilizing a unitary housing for the two separate motors.

The use of two separate motors in a unitary housing results in a saving of space, reduced noise levels, and a saving in energy. These advantages come about in a number of ways depending on the mode in which the air conditioning unit is being used and the ambient conditions under which the unit is operating.

The use of two motors permits choosing a motor which is particularly suitable for operating its associated fan. It is often advantageous to be able to vary the inside (evaporator) coil fan speed when operating the air conditioner in its usual cooling mode. Thus, when maximum cooling is not necessary, the evaporator coil fan can be slowed down, resulting in a savings in energy and in quieter operation. For some applications a smaller motor can be utilized for the inside coil fan, accomplishing a still further energy savings. If a single speed single motor with a double shaft is utilized, this variation in the speed of the evaporator coil fan is normally accomplished by utilizing a gear box when condenser fan speed must be maintained. When two motors are used, this can be accomplished by utilizing a six-pole or four-pole multi-speed motor for the evaporator coil fan and a relatively simple four-pole or six-pole single speed motor for the condenser coil fan. An arrangement incorporating two motors, each of about half the power output utilized when a single double shafted motor is employed, will take up approximately the same room as a single multi-speed motor or somewhat less room than the larger double-shafted motor with associated gear box and use less energy. Additionally, the gear-box/double-shafted motor arrangement is heavier, more expensive and noisier.

The use of two motors is also advantageous when the air conditioner unit is provided with an auxiliary electrical heating coil element for use in warming the air in a room. In this mode of operation one need only activate the inside fan, as the compressor, and therefore the condenser coil, is not being used. This, results in a savings in energy necessary to drive the fan motors as well as in a lower noise level for the unit.

In applications wherein the outside ambient temperature is extremely high, providing an air conditioning unit with an outside (condenser) coil fan of higher speed while providing the inside (evaporator) coil with a fan of lower speed can give an air conditioning unit sufficient flexibility to provide some cooling where the unit may otherwise stall from the load. A high speed outside (condenser) coil fan will increase the apparent efficiency of the compressor while a slower inside (evaporator) coil fan will simultaneously reduce the load on the compressor. Under less severe conditions this mode of operation results in more efficient operation of the unit then would otherwise be accomplished. Additionally, more comfortable cooling is provided as the unit will operate for longer periods of time at low speed thereby accomplishing extended humidity control.

A related advantage to operating an air conditioning unit in a mode wherein the outside (condenser) coil fan is operated at a higher speed is, under "normal" ambient conditions, the reduced surface area required for the outdoor (condenser) coil surface to obtain the same efficiency of operation for the compressor. This conserves materials which would otherwise be required to make a larger condenser coil surface and reduces head pressures and therefore the load or energy consumed in the compressor circuit.

As both motors are mounted in a unitary housing, aside other considerations, there is a cost reduction in materials and manpower utilized in assemblying an air conditioner unit, over using two separately mounted motors, in that both units are mounted simultaneously and require only one set of brackets, bolts, straps, or other means normally employed for mounting motors. In fact, little or no retooling costs are incurred in substituting a double-motor construction, according to the present invention, for the single motor double-shafted construction now normally utilized in air conditioners.

Some cost savings can also be realized when utilizing a single envelope construction by assemblying both motors using a single central bearing.

The double motor system described herein has been found to run cooler than the larger single motor double shafted system often utilized in the prior art, thereby contributing to the increased efficiency of this system. It may, in fact, be possible for certain combinations to utilize lower tool horsepower than was previously required by the single motor, by utilizing a lower powered indoor (evaporator) fan motor, as noted above.

It has also been found that a system according to the present invention will operate under the low line voltages normally encountered in regions where high ambient temperatures are prevalent. Prior systems utilizing a double-shafted motor have been found to stall under these conditions. Thus an air conditioner unit, according to the present invention, will not only operate more efficiency than the usual units with a double-shafted single motor, but will operate under conditions under which the usual unit will not operate at all.

BRIEF DESCRIPTION

The present invention combines the advantages of a double-shafted single motor which drives both the inside coil blower and the outside coil blower or fan, with the advantages of two separate motors, by providing a fan motor unit comprising a unitary housing within which are formed two separate motors. The construction may either utilize a single envelope or two separate motor housings. The motor combination is otherwise substantially conventional.

In a preferred embodiment, one of the two motors is a single speed motor, e.g. four-pole motor, to drive the outdoor coil fan and the other is a multi-speed motor, e.g. six-pole motor, to drive the indoor coil fan or blower. Both are mounted in a single envelope and may share a common central bearing.

DESCRIPTION OF THE PREFERRED EMBODIMENT

Figure 1:
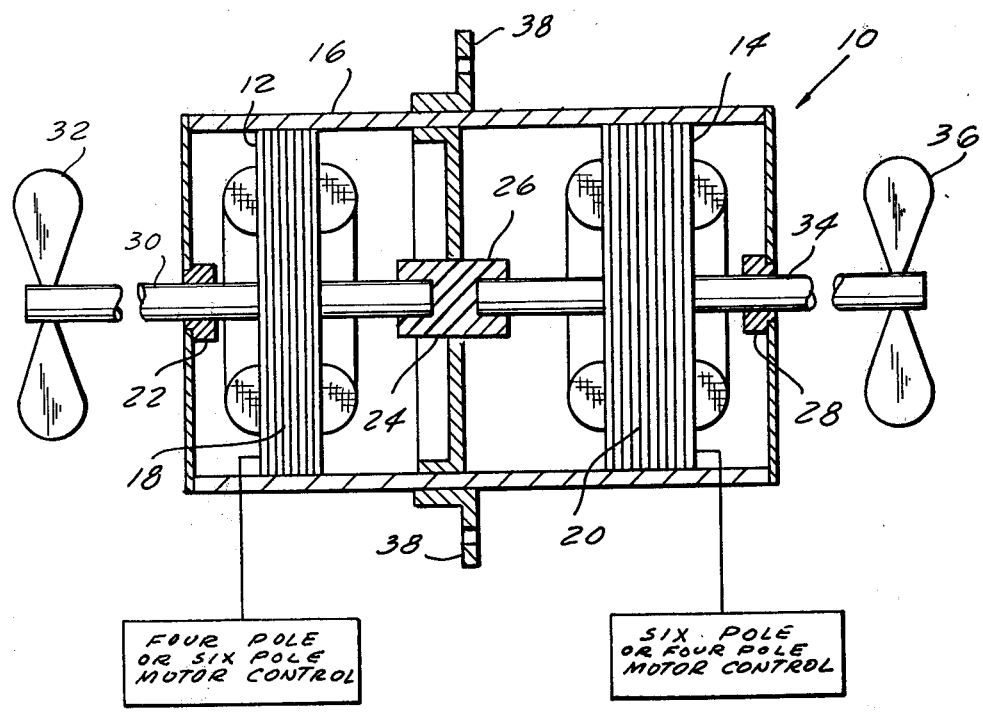
FIG. 1 is a schematic representation of a fan motor unit according to the present invention showing two separate motors formed in a single housing adapted to be mounted with one set of mounting lugs.

Referring now to FIG. 1, schematically shown is a fan motor unit 10 having a four-pole motor 12 and a six pole motor 14 formed within a common envelope or housing 16. Each motor 12, 14 has a separate armature 18, 20. Other than a four-pole/six-pole combination described here may be substituted depending on considerations such as physical or load requirements of the unit, energy usage, and cost factors.

The four-pole motor armature 18 has an outer bearing 22, and shares a central bearing 24 with the six-pole motor armature 20. The six-pole motor armature is also supported on outer bearing 28. Thus, each motor 12, 14 is an independent unit which may be controlled by separate respective motor controls of any usual type, without being affected by the other. Except that both motors 12, 14 are formed in a common motor housing or envelope 16, their construction may be substantially conventional. The motors 12, 14 may even be formed with separate central bearings, analogous to the embodiment of FIG. 4, at 124, 126.

Figure 4:
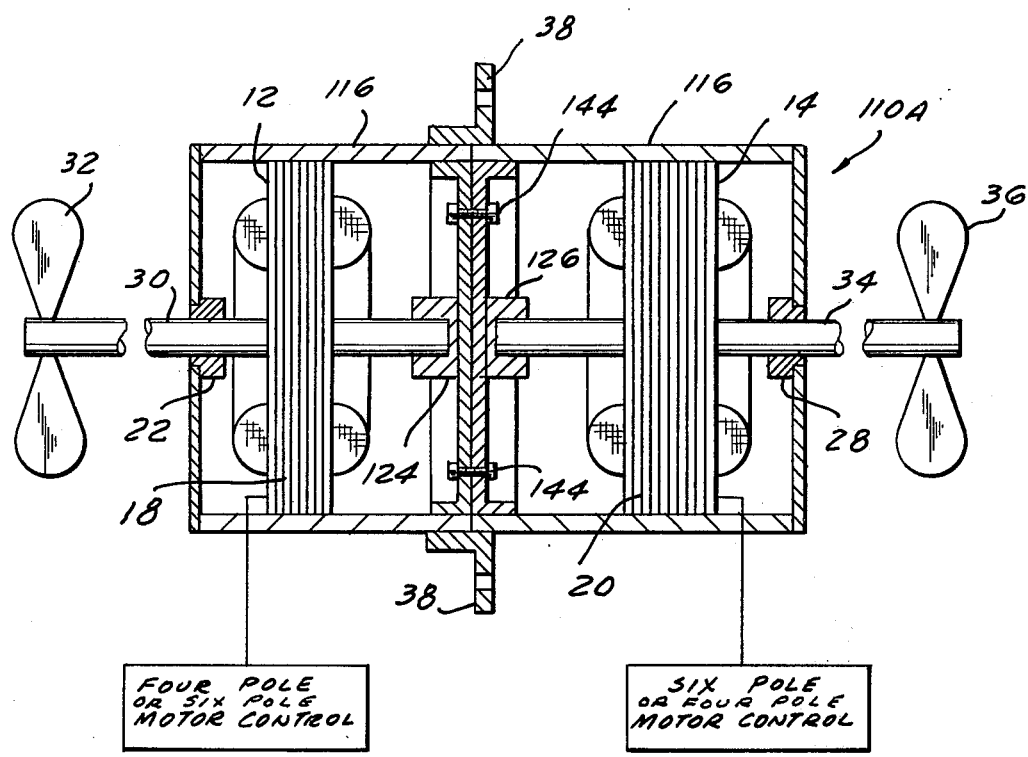
FIG. 4 is a schematic representation of a fan motor unit similar to that shown in FIG. 1, but utilizing two separate motor housings bolted together in place of a single envelope.

The fan motor unit 110 of FIG. 4 has substantially the same construction as the fan unit 10 of FIG. 1, except that two motor casings 116, 116 are secured together such as by bolts 144, 144 to form the unitary housing and two separate central bearings 124, 126, are generally required.

For the preferred embodiment shown herein, a shaft 30, driven by armature 18 of the four-pole motor 12, is associated with any usual outdoor coil fan 32 shown schematically in FIG. 1. Similarly, six-pole motor armature 20 drives a shaft 34 which in turn drives an indoor coil blower or fan 36, also shown schematically in FIG. 1. Operation of the embodiment of FIG. 4 is substantially identical to that of the FIG. 1 embodiment.

Figure 2:
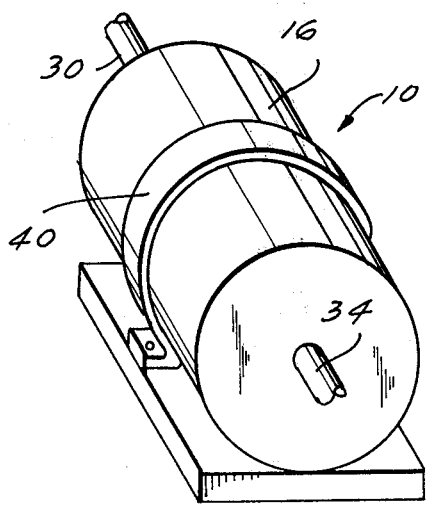
FIG. 2 is a perspective view of a fan motor unit according to the present invention showing a single clamp mounting for the unit.
Figure 3:
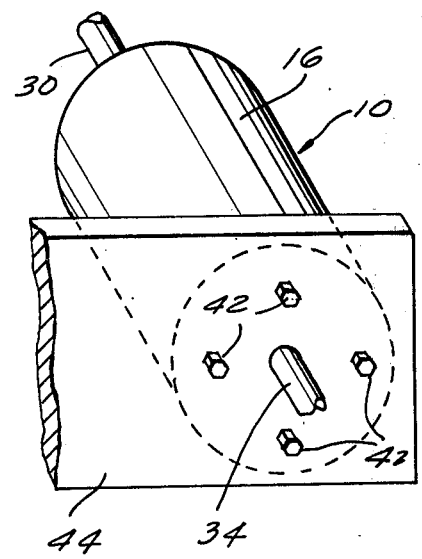
FIG. 3 is a perspective view of a fan motor unit according to the present invention showing throughbolt mounting to a bracket or wall.

Because both motors 12, 14 are formed in a unitary housing or envelope 16, 116 they are simultaneously mounted with the mounting of the common housing or envelope 16, 116. Mounting may be done by any usual method such as by a series of mounting lugs 38 secured to the housing 16, 116. Other methods of mountings include the use of a mounting clamp or strap 40 as schematically shown in FIG. 2 or the use of through bolts 42 to bolt the housing to a suitable wall or bracket 44, as schematically shown in FIG. 3.

The physical mounting and driving connections for a fan motor unit according to the present invention are substantially the same as the prior art double-shafted motor over which it is an improvement. Thus it can easily replace the usally employed double-shafted motor without the very considerable expenses associated with retooling.

Presented below in Tables "A" and "B" are data obtained by comparing an air conditioner system utilizing a usual double-shafted ⅓ HP motor with a system utilizing two 1/6 HP motors in accordance with the present invention.

The data in Table A was obtained under standard rating conditions AHAM STD RAC-1 (American National Standard Z234.1): the data in Table B was obtained under high ambient temperatures —as set forth in the table: 90 degrees F. dry bulb "inside"; 125 degrees F. dry bulb "outside"—to simulate the type of ambient conditions under which an air conditioner according to the present invention is especially suitable for operation.

As can be seen from Table A, the two units operate with about the same efficiency at standard rating conditions, with a small increase in efficiency indicated for the double-motor system. However, as Table B indicates, an efficiency of 15.3% can be realized by the double-motor system under the high ambient temperature conditions of these tests.

TABLE A

|  | 1/3 HP Single Motor Design | 1/6 HP Each For Dual Motor Design |
|---|---|---|
| Std. Rating Cond. (Hi Spd.) 80° DB/67° WB Inside 95° Outside | | |
| Volts | 240 | 240 |
| Amps - Comp/Motor/Total | 13.5 2.4 15.8 | 13.6 1.1+1.1 15.6 |
| Watts - Comp/Motor/Total | 2900 540 3530 | 2870 245+250 3370 |
| Inside Fan RPM | 1250 | 1130 |
| Outside Fan RPM | 1250 | 1335 |
| Discharge PSIG | 313 | 294 |
| Suction PSIG | 67.0 | 69 |

TABLE B

|  | 1/3 HP Single Motor Design | |
|---|---|---|
| High Amb. Op. Cond. (Lo. Spd.) 90° DB Inside 125° DB Outside | | |
| Volts (Low Volt Operation) | 210 | 210 |
| Amps - Comp/Motor/Total | 21.1 1.85 23.1 | 18.0 .62+1.0 19.9 |
| Watts - Comp/Motor/Total | 4290 355 4650 | 3620 120+200 3940 |
| Inside Fan RPM | 965 | 750 |

TABLE B-continued

|  | 1/3 HP Single Motor Design | |
| --- | --- | --- |
| Outside Fan RPM | 965 | 1300 |
| Discharge PSIG. | 480 | 417 |
| Suction PSIG | 79 | 70.5 |
| Discharge Gas F° | 243° | 227° |

$(4650-3940) = \frac{710^w}{4650} \times 100 = 15.3\%$ Power Saving at Low Fan Speed when operating in a 125° Outdoor ambient at 210 Volts.

Note:
Additional saving is experienced at lower operating voltages. (At 198 Volt supply voltage, the single motor design tripped on Compressor Overload due to high pressures and current. The dual motor design continued to function and did not trip on overload until the voltage was dropped to 184 Volts).

The note in Table B with respect to observations made when attempting to compare the two systems under reduced line voltage conditions reports a difference between the two systems of particular practical importance. The type of ambient temperatures which are reflected in Table B are those prevalent in desert regions of the world. In many of these regions reduced line voltages are prevalent, especially at the end of a long distribution line. An air conditioning unit, according to the present invention, not only has an efficiency advantage over the usual double-shafted single motor system, but will operate under conditions which are encountered in certain applications and under which condition the single motor system will not operate.

What is claimed is:

1. In an improved air conditioning unit of the type having a compressor circuit including a condenser coil, an evaporator coil and a compressor and wherein air, from which heat is to be removed, is forced over the evaporator coil by an evaporator coil fan driven by an evaporator coil fan motor, and air, which is to remove heat from the unit, is forced over the condenser coil by a condenser coil fan driven by a condenser coil fan motor, the improvement comprising:

a unitary motor housing adapted for mounting in said unit, said evaporator coil fan motor and said condenser coil fan motor being individually formed in said unitary motor housing whereby both said motors will be simultaneously mounted when the housing is mounted; and control means operable to maintain operation of the air conditioning unit under high ambient temperature conditions by reducing the load on the compressor circuit, said control means comprising separate motor controls for said evaporator coil fan motor and said condenser coil fan motor and being responsive to high ambient temperature conditions to reduce the speed of the evaporator coil fan motor independently of the control of the speed of the condenser coil fan motor.

2. An air conditioner unit as claimed in claim 1 wherein the evaporator coil fan motor is a multi-speed type of motor.

3. An air conditioning unit as claimed in claim 1 wherein said unitary housing is a single envelope.

4. An air conditioning unit as claimed in claim 3 wherein both said fan motors share a common central bearing.

5. An air conditioning unit as claimed in claim 1 wherein said unitary housing is formed by two separate motor casings secured together.

6. An air conditioning unit as claimed in claim 1, wherein said evaporator coil fan is of lower power rating than said condenser coil fan.

7. The air conditioning unit of claim 1 wherein the speed of the condenser coil fan motor is higher than any of the speeds of the multi-speed evaporator coil fan motor.

8. In an improved air conditioning unit of the type having a compressor circuit including a condenser coil, an evaporator coil and a compressor and wherein air from which heat is to be removed is forced over the evaporator coil by an evaporator coil fan driven by an evaporator coil fan motor, and air which is to remove heat from the unit is forced over the condenser coil by a condenser coil fan driven by a condenser coil fan motor, the improvement comprising a unitary motor housing adapted for mounting in said unit, and said evaporator coil fan motor and said condenser coil fan motor being individually formed in said unitary motor housing whereby both said motors will simultaneously be mounted when the housing is mounted; said evaporator coil fan motor being a multispeed six-pole motor and said condenser coil fan motor being a four-pole motor.

9. An air conditioning unit as claimed in claim 8 wherein said four-pole motor is controlled by a four-pole motor control unit and said six-pole motor is controlled by a six-pole motor control unit.

10. The air conditioning unit of claim 8 wherein the speed of the condenser coil fan motor is higher than any of the speeds of the multi-speed evaporator coil fan motor.

11. In an improved air conditioning unit of the type having a compressor circuit including a condenser coil, an evaporator coil and a compressor and wherein air from which heat is to be removed is forced over the evaporator coil by an evaporator coil fan driven by an evaporator coil fan motor, and air which is to remove heat from the unit is forced over the condenser coil by a condenser coil fan driven by a condenser coil fan motor, the improvement comprising a unitary motor housing adapted for mounting in said unit, and said evaporator coil fan motor and said condenser coil fan motor being individually formed in said unitary motor housing whereby both said motors will simultaneously be mounted when the housing is mounted; said evaporator coil fan motor being a multispeed four-pole motor and said condenser coil fan motor being a four-pole motor.

12. An air conditioning unit as claimed in claim 11 wherein each said four-pole motor is controlled by a separate four-pole motor controller.

13. The air conditioner unit of claim 11 wherein the speed of the condenser coil fan motor is higher than any of the speeds of the multi-speed evaporator coil fan motor.

* * * * *